United States Patent [19]

Hostetler

[11] Patent Number: 5,048,462
[45] Date of Patent: Sep. 17, 1991

[54] HANGER FOR WATER SUPPLY SYSTEM AND METHOD OF INSTALLATION

[75] Inventor: Robert H. Hostetler, Goshen, Ind.

[73] Assignee: Avtron Inc., Elkhart, Ind.

[21] Appl. No.: 429,226

[22] Filed: Oct. 31, 1989

[51] Int. Cl.$^5$ ............................................. A01K 7/00
[52] U.S. Cl. ........................................ 119/72; 248/61; 119/72.5
[58] Field of Search ............... 119/72, 72.5, 75, 77; 248/61, 62, 63, 328; 24/543

[56] References Cited

U.S. PATENT DOCUMENTS

| | | | |
|---|---|---|---|
| 824,544 | 6/1906 | Hossege | 248/61 X |
| 3,247,852 | 4/1966 | Schneider | 24/543 X |
| 3,878,590 | 4/1975 | Bolger | 248/61 X |
| 4,267,800 | 5/1981 | Keller et al. | 119/72.5 |
| 4,284,036 | 8/1981 | Hostetler | 119/72.5 |
| 4,360,178 | 11/1982 | Senter et al. | 24/543 X |
| 4,491,088 | 1/1985 | Hostetler | 119/72.5 |
| 4,589,373 | 5/1986 | Hostetler et al. | 119/72.5 |
| 4,637,345 | 1/1987 | Hostetler | 119/72.5 |
| 4,669,422 | 6/1987 | Steudler, Jr. | 119/72 |
| 4,724,797 | 2/1988 | Steudler, Jr. | 119/72 |
| 4,753,196 | 6/1988 | Lack et al. | 119/72 |
| 4,794,881 | 1/1989 | Rader | 119/72.5 |
| 4,884,528 | 12/1989 | Steudler, Jr. | 119/72.5 |
| 4,892,061 | 1/1990 | Steudler, Jr. | 119/72.5 X |

OTHER PUBLICATIONS

Instruction Sheet entitled: Forty Steps to Install Your "Val"-Nipple Drinking System.
Aktive (R) Floor Watering System pamphlet, Vollenhoverweg 20-1, 8316 PZ Markenesse; Netherlands.

Primary Examiner—Gene Mancene
Assistant Examiner—R. Thomas Price
Attorney, Agent, or Firm—Jeffers, Hoffman & Niewyk

[57] ABSTRACT

The present invention is a water supply system for fowl and small animals which includes a hanger slidably engaging a ballast pipe connected to a conduit having a plurality of dispensing valves. The hangers are connected to flexible lines of a suspension system, with the lower surface of the hanger engaging the upper surface of the conduit to align vertically the dispenser valves, the ballast pipe, and the flexible lines. To install the water supply system, the ballast pipe is assembled and the hangers are attached then positioned at locations corresponding to flexible lines of the suspension system. The conduit is separately assembled and is connected to the ballast pipe. Finally, the water supply system is suspended at a height so that the fowl and small animals can reach the dispenser.

31 Claims, 3 Drawing Sheets 5,048,462

HANGER FOR WATER SUPPLY SYSTEM AND METHOD OF INSTALLATION

BACKGROUND

The present invention relates to water supply systems for fowl or small animals. More specifically the field of the invention is that of hangers for suspending an elongate water dispensing assembly.

The proper provision of water is essential for safe and efficient nurturing of fowl and small animals, for example in raising chickens. The proper amount of water is critical to develop the chickens quickly for consumption, and is at least as important as food. Water is important in terms of cost because chickens receiving more water consume less food. In addition to the chickens needing water to grow, water can provide other benefits, for example, medicine and vitamins can be added to provide the chickens beneficial nutrients. However, problems with the water supply can adversely affect the chickens. Leakage in the water supply system can foster bacteria growth and infection, and left unchecked can flood the hen house and drown the chickens. Therefore, water accumulating on the floors of the hen house should be avoided.

To accommodate the desire for better water supply, water supply systems exist which include a horizontal supply conduit having dispensers with a housing and a valve clamped to the conduit. These prior art systems utilize plastic bodies and metal parts commonly formed by machining. The machined parts of the valve can wear and an effect of that wear is that the rate of liquid flow through the valve increases, to the point the flow is in excess of what the chicken can ingest. If too much water is dispensed in each valve opening, then the excess water can wet the chicken and wet the litter which fosters bacteria and mold and thereby endangers their lives. The aforementioned wear necessitates replacement or removal of the valves of water supply systems.

A watering system described in U.S. Pat. Nos. 4,284,036, 4,491,088, 4,589,373, and 4,637,345 solves many of the aforementioned problems, and each of these patents is expressly incorporated by reference herein. Referring to FIG. 7, the valve 10 has a tubular body 12 with a tapered lower bore 14. Valve 10 is sealed by a pin 16 having a head 18 resting its lower surface 20 on a rubber cup 22 inside the valve 10. A metal ball 24 sets on the head 18, and three ring seal 26 is formed by head 18 abutting cup 22 and ball 24 abutting two seats 28 of cup 22. Ball 24 is unseated by tilting pin 16 and moving it out of axial alignment with body 12, so that the head lower surface 20 rests only on a small portion of cup 22, and ball 24 is raised to move it out of engagement with seats 28. Only a small amount of water is able to flow through the restricted gaps between ball 24 and cup 22 when pin 16 is tilted, and the droplet so formed flows along pin 16 to its bottom end 30. Pin 16 is a shiny metallic element which attracts the attention of chickens. Normally, a chicken moves pin 16 with its beak, and valve 10 lets a small droplet of water pass so that the chicken can easily consume the droplet as it flows down pin 16.

Valve 10 is mounted on the underside of conduit 32 at predetermined points. Annular flange 34 extends from body 12 and receives 0-ring 36 which seals valve 10 to the conduit 32. A lateral projection 38 has a shank 40 with a hook 42 for attaching over a part of an integral section of conduit 32. The conduit 32 is attached to the underside of a ballast pipe 44 by a wrap connector 46 which is sonically welded to the conduit 32. Ballast pipe 44 may be any rigid elongate member, such as a galvanized steel pipe. As depicted in FIG. 2, wrap connector 46 is bolted to ballast pipe 44 and thus holds conduit 32 in spaced relation below. Fingers 48 at the top of wrap connector 46 are used to hold an electrically conductive cable. In FIG. 3, wrap connector 46 is shown disassembled into upper portion 50 and lower portion 52. Lower portion 52 has a hook 54 on one side for locking with slot 56 of upper portion 50. Bolt 58 extends through each portion 50 and 52 on the opposite side of slot 56 and hook 54, and is threadably engaged by nut 60 to couple upper and lower portions 50 and 52. Upper portion 50 also has notches 62 on the peripheral wall 64, with a total of four notches 62 positioned equiangularly around the circumference of wall 64.

To assemble the prior art system, a plurality of water conduit segments is cut to predetermined lengths so that their associated wrap connectors will be located at a position corresponding to a flexible line of a suspension system. Next, for each conduit segment a section of ballast pipe is set on semicircular top surface 66 and upper portion 50 is positioned so that hook 54 extends into slot 56. Pivoting on the hook and slot connection, upper portion 50 is moved to locate semicircular bottom surface 68 adjacent to the ballast pipe section, with bolt 58 being threaded with nut 60 and tightened to clamp firmly the wrap connector to the ballast pipe section. After assembling each conduit and ballast pipe pair, the resulting plurality of assemblies is coupled together sequentially to form an elongate water supply assembly.

To hang the water supply assembly, flexible lines of the suspension system are attached through notches 62. A U-hook (not shown) may be used to attach wrap connector 46 to a flexible line, although the flexible lines can also extend through notches 62. The U-hook is attached to wrap connector 46 by its ends extending through notches 62, and the flexible lines are then conveniently tied to the U-hook. After suspending the water supply assembly, some valves 10 may not be perfectly vertical and hence leak. To correct the leaks, each wrap connector 46 must be individually loosened and either the conduit 32 or ballast pipe 44 twisted until the valve 10 is perfectly vertical. Often, several adjustments must be made to stop all the leaking. The checking and adjusting of the water supply assembly requires additional time to install, and the resulting system is inherently less reliable. What is needed in the art is a poultry watering system which can be more easily installed.

SUMMARY OF THE INVENTION

The present invention is a water supply system for fowl or small animals. The arrangement of the system provides numerous advantages, which improve the ease of installation and automatically vertically align the dispenser valves. The adjustable hanger of the present invention slidably engages the ballast pipe and aligns the dispenser valves to accomplish these advantages.

The location of the suspension system is not constrained by the water supply system because the hangers are slidably movable along the ballast pipe. Thus, a hanger can be slid to a position under one of the pulley suspension lines, then the connection to the water supply assembly can be made. In the prior art, the location of the wrap connector is fixed on the conduit, requiring the conduit sections to be cut and joined to provide a wrap connector and U-hook at the locations of the suspension lines. The elimination of the conduit section measuring, cutting, and placing steps during installation of a water delivery system saves time and provides a more reliable method of suspending the system.

The installation of the water delivery system is further facilitated by independently assembling the ballast and conduit members. The structure of the present invention allows the hangers to be positioned independently of the conduit, so that the ballast pipe can be assembled and the hangers positioned according to the arrangement of the suspension system. The conduit can be pre-assembled, and finally the wrap connectors of the conduit couple it to the ballast pipe. With prior art designs, after the ballast pipe and conduit segments are connected then assembled together, many of the segments require further individual adjustment. With the present invention, segments of the ballast pipe and conduit do not have to be individually coupled before connecting the entire assembly, which avoids the extra adjustment step and results in time savings, installation convenience, and reliability.

The present invention also provides for automatically aligning the dispenser valves in a vertical orientation to prevent leakage. The lower surface of the hanger has a concave bottom surface matching the outside top surface of the conduit. This engagement aligns the dispenser valves, the ballast pipe, and the flexible lines to ensure that the dispenser valves will be perfectly vertical. When the valve is perfectly vertical, its pin maintains the valve in a closed position.

The hanger has two upstanding arms which join at the top in a snap fit. The hanger is easily connected to the ballast pipe by opening the arms and slipping the pipe in between. An engaging portion of the hanger slidably engages the ballast pipe, while the upper ends of the arms define aligned holes which form an aperture for the flexible line or U-hook to extend through when the arms are snapped together. The ballast member gives support and rigidity to the conduit, and its weight helps to deter swinging of the conduit.

The present invention is, in one form, a water supply system for fowl or small animals. The system comprises a tubular conduit for supplying water, an elongate ballast member, a suspension system, and a plurality of hangers. The conduit has a plurality of dispenser valves coupled to it for dispensing water to the fowl or small animals. The elongate ballast member supports the conduit which has connectors for rigidly attaching the conduit to the ballast member. The suspension system suspends the ballast member and the conduit, and it includes a plurality of flexible lines extending downwardly. A plurality of hanger members is coupled to respective flexible suspension lines, with the hanger members being slidably mounted on the ballast member and having a lower surface engaging an upper surface of the conduit to maintain vertical alignment between the dispenser valves, the ballast member, and the suspension lines.

The present invention is, in another form, a method of installing, within a building, a water supply system for fowl or small animals. First, a suspension system is provided within the building wherein a plurality of flexible lines extend downwardly. An elongate ballast member is attached to a plurality of hangers. Next, the hangers are slid on the ballast member to positions corresponding to the flexible lines of the suspension system. After being properly positioned, the hangers are coupled to the suspension system so that the ballast member is suspended within the housing at a convenient height. Once suspended, the water supply assembly is connected to the ballast member, and finally the ballast member is suspended at a height so that the fowl or small animals can reach the dispenser valves.

One object of the present invention is to provide a water supply system which includes slidable hangers to facilitate connection with a suspension system.

Another object of the present invention is to provide an improved method of installing a water supply system wherein the ballast pipe is first assembled with hangers at desired positions, and then the water supply assembly is attached to the ballast thus completing the water supply assembly.

A further object of the present invention is to provide a water supply system which automatically vertically aligns the valves to prevent leakage.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
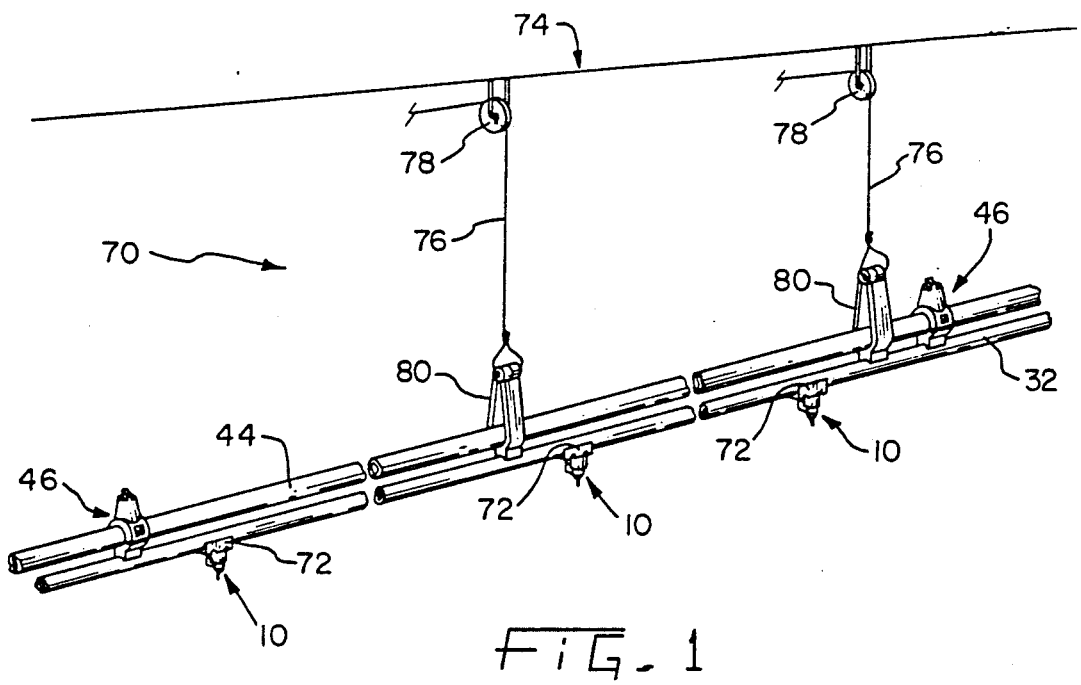
FIG. 1 is a perspective view of a water supply system utilizing the hangers of the present invention.
Figure 3:
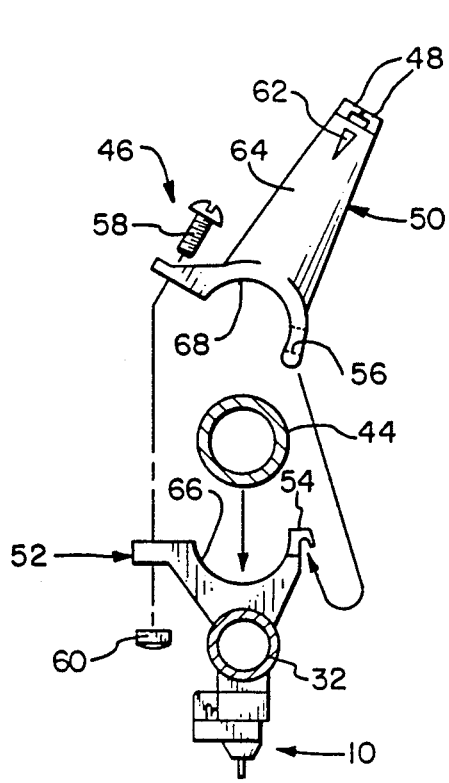
FIG. 3 is an exploded view of the wrap connector of FIG. 2.
Figure 2:
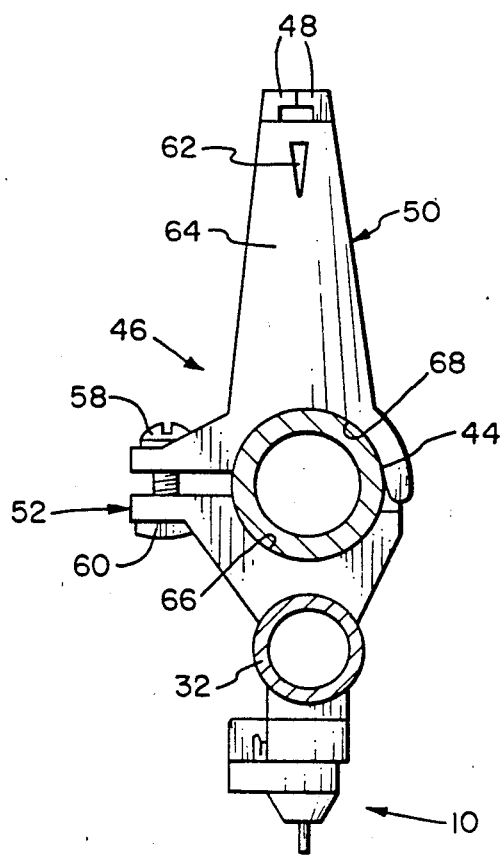
FIG. 2 is an elevational view partially in section of a prior art wrap connector disposed around a ballast member.

Corresponding reference characters indicate corresponding parts throughout the several views. The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

The water supply system 70 of the present invention is shown in FIG. 1. A plurality of dispenser valves 10 extends from discharge points 72 on conduit 32 for supplying water to the fowl or small animals. Conduit 32 is coupled to a pump pressure regulator (not shown) which provides a supply of pressurized water flow. Wrap connectors 46 are spaced on conduit 32 and attach to ballast pipe 44. Suspension system 74 comprises flexible lines 76 which extend downwardly from suspension pulleys 78, preferably straight down from each pulley 78 to the respective hanger 80. The flexible lines 76 loop through respective hangers 80 and are tied. A plurality of hangers 80 is positioned at locations along ballast pipe 44 corresponding to the locations of suspension pulleys 78.

In use, conduit 32 is suspended a certain predetermined distance above the floor of the building so that the fowl or small animals can reach pin 16 and drink from valve 10. For maintenance and cleaning, conduit 32 is raised above the floor by means of suspension system 74 and further, the height of conduit 32 can be adjusted according to the particular fowl or small animal to be watered.

Figure 4:
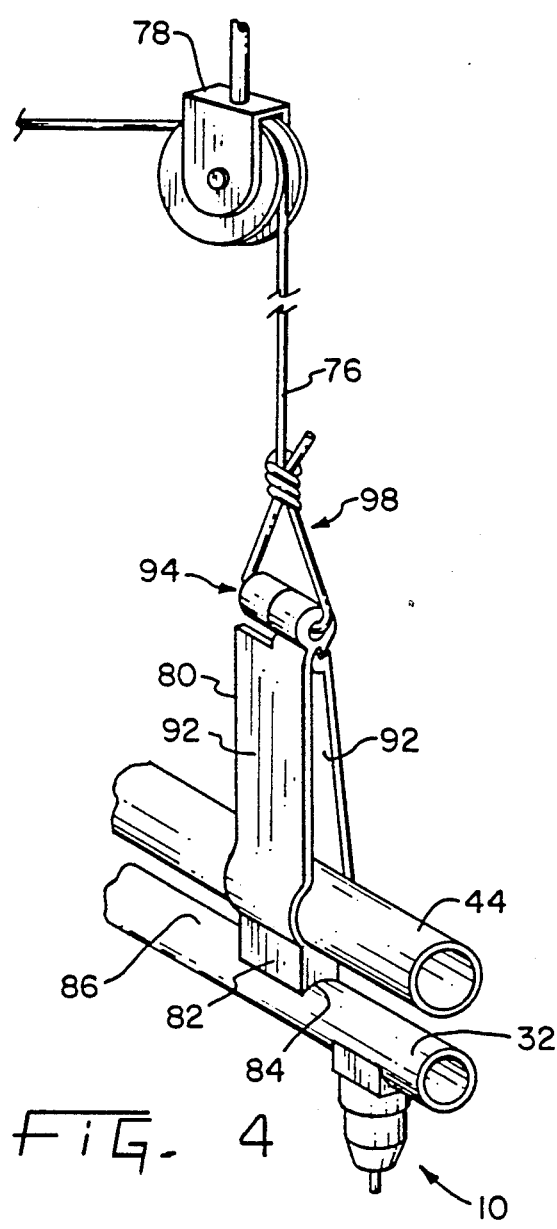
FIG. 4 is a perspective view of the water supply system of the present invention.
Figure 5:
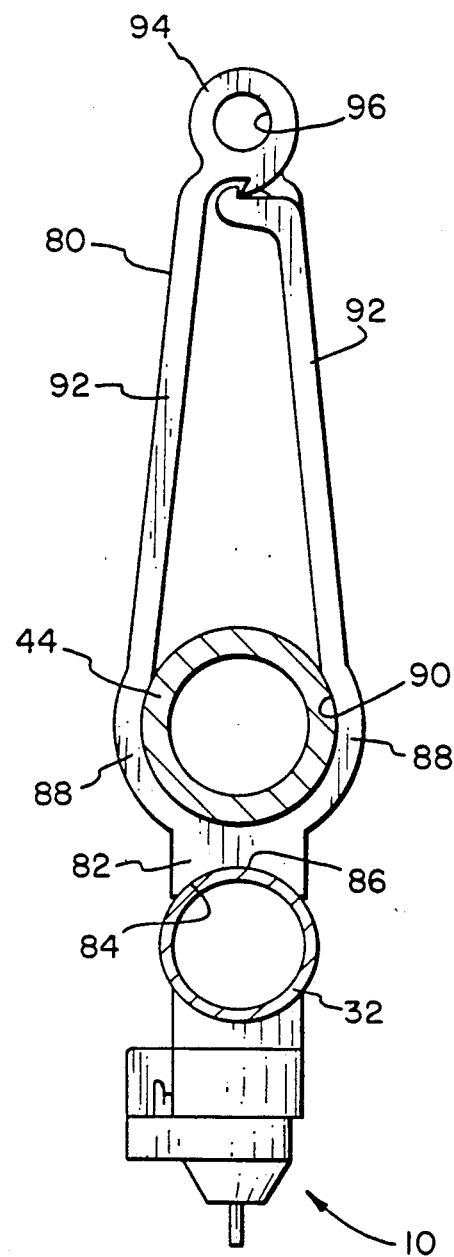
FIG. 5 is a sectional view of the hanger with the ballast pipe and the conduit.
Figure 6:
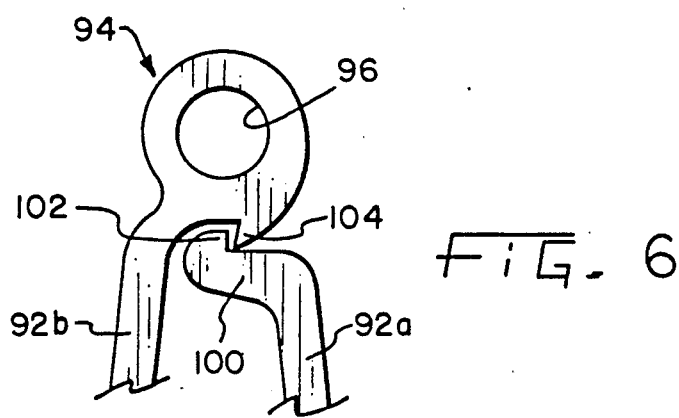
FIG. 6 is an enlarged fragmentary view of an upper portion of the hanger.
Figure 7:
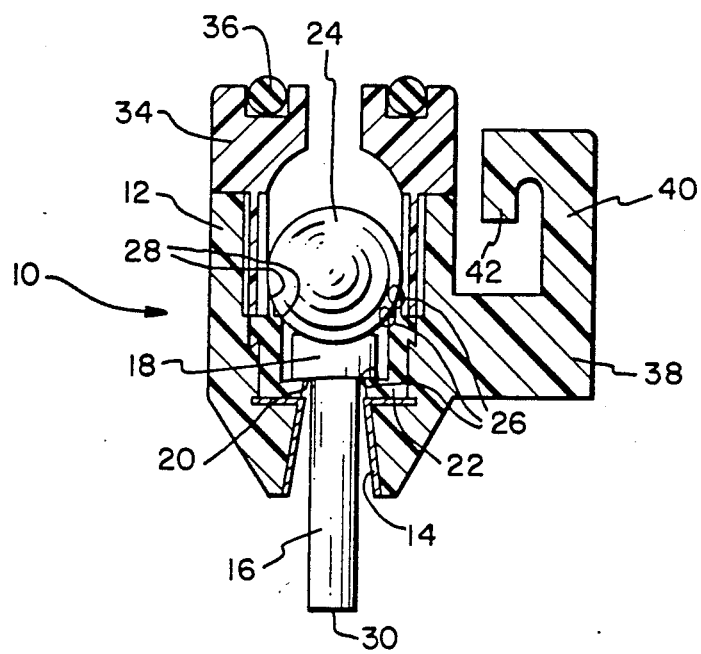
FIG. 7 is a sectional view of a prior art dispenser valve.

In accordance with the present invention, hangers 80 slidably engage ballast pipe 44 so that their positions on ballast pipe 44 are easily changed. Referring to FIGS. 4, 5, and 6, each hanger has a base portion 82 with a concave bottom surface 84 that preferably matches upper surface 86 of conduit 32. However, bottom surface 84 could be angularly shaped, such as a right angle or a rectangular recess, which vertically aligns the position of hanger 80 in relation to conduit 32. From the sides of base 82 extend arcuate engaging portions 88 which form a circular opening 90. Ballast pipe 44 is received within opening 90, with hanger 80 contacting pipe 44 at over half of its circumference thus entrapping it. Arms 92 extend upwardly from each engaging portion and meet at their adjacent terminal loop portions 94.

Each arm 92 has a uniform width to terminal loop portion 94, which is approximately half as wide. Terminal loop portions 94 abut each other in the hanger's closed position to define aperture 96 which accepts flexible line 76. In this manner, line 76 can be tied to form a loop 98 which extends through aperture 96 thus coupling line 76 and hanger 80. To provide interlocking between the tops of arms 92, arm 92a has a keeper 100 with a latch portion 102 that engages snap edge 104 of arm 92b. Although the latching structure of the tops of arms 92 is not needed to attach hanger 80 to a flexible line, it conveniently interlocks the terminal loop portions so line 76 can easily be guided through aperture 96.

In accordance with the present invention, water supply system 70 is assembled modularly. First, suspension system 74 must be provided so the hangers 80 can be attached to and suspended by the flexible lines 76. In many buildings, particularly older ones, a system of pulleys or other suspension means already exist. In newer buildings, the installation of a suspension system is necessary and is accomplished in a known manner. The locations of the suspension pulleys 78 need not be predetermined by the water supply assembly (conduit 32, valves 10, and connectors 46) because the hangers 80 are slidable on the ballast pipe 44. The only restriction on the placement of pulleys 78 is that a maximum distance of three (3) meters should preferably separate adjacent hangers 80.

Figure 8:
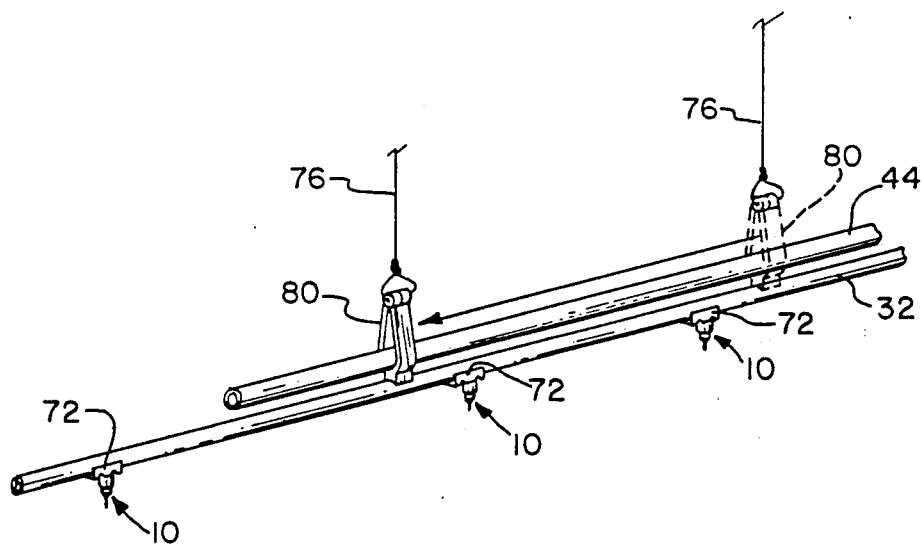
FIG. 8 is a perspective view of a water supply system showing the sliding of a hanger along the ballast member.

After the suspension system 74 is installed, the ballast pipe 44 and hangers 80 are connected and properly arranged. The ballast pipe 44 is assembled in a known manner. The arms 92 of each hanger 80 are opened to receive the ballast pipe 44, and the hangers 80 can then be slid anywhere along the ballast pipe 44 (see FIG. 8). Preferably, there is one hanger 80 for each line 76 of the suspension system 74, and every hanger 80 is slidably positioned at a location on the ballast pipe 44 directly below a pulley 78. The terminal loop portions 94 of the hangers 80 are then latched together to form the aperture 96.

Once the hangers 80 have been attached to the ballast pipe 44 and appropriately positioned, the flexible lines 76 are threaded through the aperture 96 and tied to form a loop 98. With the ballast pipe 44 now depending from the flexible lines 76, the water supply conduit 32 and associated dispenser valves 10, which are assembled in a known manner, are then connected to the ballast pipe 44 by wrap connectors 46. Finally, the entire assembly is raised or lowered to a height so that the chickens can reach the pins 16 of the dispenser valves 10.

Hangers 80 are preferably made of hard, non-abrasive plastic material such as polypropylene and are preferably integrally fabricated by an injection molding process.

While this invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and which fall within the limits of the appended claims.

What is claimed is:

1. A water supply system for fowl or small animals, comprising:
   an elongate ballast member;
   a tubular water supply conduit;
   connecting means for rigidly attaching said conduit to said ballast member;
   a plurality of valve means on said conduit for providing water to the fowl or small animals, said plurality of valve means in fluid communication with said conduit;
   suspension means for suspending said ballast member and said conduit, said suspension means having a plurality of flexible lines extending downwardly; and
   a plurality of hanger members slidably engaging and suspending said ballast member, each of said hanger members coupled to a corresponding one of said flexible lines so that said suspension means can suspend said ballast member and said conduit, each said hanger including a first and second arm capable of separation to allow said ballast member to pass through, each said hanger further including a latching means for releasably holding said first and second arms together at their upper ends, said latching means including a keeper having a latch portion located at said upper end of said first arm, and a snap edge located at said upper end of said second arm.

2. The water supply system of claim 1 wherein each said flexible line extends straight down to a corresponding one of said hanger members.

3. The water supply system of claim 1 wherein said hanger members can slide anywhere over said ballast member.

4. The water supply system of claim 1 wherein said hanger members can slide within predefined areas along said conduit.

5. The water supply system of claim 1 wherein said first and second arms have terminal loop portions defining an aperture, respective said flexible lines being looped through said apertures to connect said hanger member to said suspension means, said apertures having an axis generally parallel to said ballast member.

6. The water supply system of claim 5 wherein said first and second arms have a width twice that of said terminal loop portions, each of said terminal loop portions movable to align with each other and define an elongate aperture.

7. The water supply system of claim 1 wherein said hanger members are integrally fabricated of resilient plastic.

8. A method of installing, within a building having a suspension system, a water supply system for fowl or small animals, said method comprising the steps of:
providing an elongate ballast member and a plurality of hangers having two arms and means for vertically aligning with the ballast member;
attaching the hangers to the ballast member by opening the arms of the hangers and passing the ballast member through the arms, and latching the arms together at their upper ends by latching one arm over a snap edge of the other arm;
sliding the hangers to desired positions on the ballast member;
coupling the hangers to a suspension system so that the ballast member is suspended at a height convenient for accessing the ballast member;
providing a tubular conduit having a plurality of dispenser valves and a connection means thereon rigidly attaching the conduit to the ballast member so that the dispenser valves are in vertical alignment with the connection means;
then connecting the tubular conduit to the ballast member; and
raising or lowering the ballast member to a height so that the fowl or small animals can reach the dispenser valves.

9. The method of claim 8 wherein during the attaching step, the hangers are attached to the ballast member by separating hanger arms and inserting the ballast member therebetween.

10. The method of claim 8 wherein during the coupling step, the hangers are coupled to the suspension system by aligning terminal loop portions of each of the hangers, and extending a portion of the suspension system therethrough.

11. The method of claim 8 wherein during the sliding step, the hangers are slid to positions on the ballast member so that in the connecting step, the hangers are located straight down from the suspension system.

12. A method of installing, within a building, a water supply system for fowl or small animals, said method comprising the steps of:
providing a suspension system within the building;
extending a plurality of flexible lines downwardly from the suspension system;
providing an elongated ballast member and a plurality of hangers having two arms and means for vertically aligning with the ballast member;
attaching the hangers to the ballast member by opening the arms of the hangers and passing the ballast member through the arms, and latching the arms together at their upper ends by latching one arm over a snap edge of the other arm;
sliding the hangers on the ballast member to positions corresponding to the flexible lines of the suspension system;
coupling the hangers to the suspension system so that the ballast member is suspended within the housing at a height convenient for accessing the ballast member;
providing a tubular conduit having a plurality of dispenser valves and a connection means thereon rigidly attaching the conduit to the ballast member so that the dispenser valves are in vertical alignment with the connection means;
then connecting the tubular conduit to the ballast member; and
suspending the ballast member at a height so that the fowl or small animals can reach the dispenser valves.

13. The method of claim 12 wherein during the attaching step, the hangers are attached to the ballast member by separating hanger arms and inserting the ballast member therebetween.

14. The method of claim 12 wherein during the coupling step, the hangers are coupled to the suspension system by aligning terminal loop portions of the hanger and extending the corresponding flexible line therethrough.

15. The method of claim 12 wherein during the sliding step, the hangers are slid to positions on the ballast member so that in the connecting step, the flexible lines extend straight down from the suspension system to the hangers.

16. A water supply system for fowl or small animals, comprising:
tubular conduit means for supplying water;
a plurality of dispenser valve means for dispensing water to the fowl or small animals, said plurality of dispenser valve means coupled to said conduit means;
an elongate ballast member for supporting said conduit means;
said conduit means including connecting means for rigidly attaching said conduit means to said ballast member so that said dispenser valve means are in vertical alignment with a plane defined by axes of said ballast member and said conduit means;
suspension means for suspending said ballast member and said conduit means, said suspension means including a plurality of flexible lines extending downwardly; and
a plurality of hanger members coupled to respective ones of said flexible lines, said hanger members being separate and independent from said connecting means such that said hanger members may slide on said ballast member independently of said connecting means, said hanger members slidably disposed on and suspending said ballast member and having a smooth lower surface having a shape matching the shape of an upper surface of said conduit means, said hanger lower surface slidably abutting said conduit upper surface to maintain vertical alignment between said plurality of dispenser valve means, said ballast member, and said plurality of flexible lines.

17. The water supply system of claim 16 wherein each said flexible line extends straight down to a corresponding one of said hanger members.

18. The water supply system of claim 16 wherein said hanger members can slide anywhere on said ballast member.

19. The water supply system of claim 16 wherein said hanger members can slide within predefined areas along said conduit means.

20. The water supply system of claim 16 wherein each said hanger member includes a first and second arm capable of separation to allow said ballast member to pass through.

21. The water supply system of claim 20 wherein said first and second arms have terminal loop portions defining an aperture, respective said flexible lines being looped through said apertures to connect said hanger member and said suspension means.

22. The water supply system of claim 21 wherein said first and second arms have a width twice that of said terminal loop portions, each of said terminal loop portions movable to align with each other and define said aperture.

23. The water supply system of claim 20 wherein each said hanger member includes a latching means for releasably holding said first and second arms together at their upper ends.

24. The water supply system of claim 23 wherein said latching means includes a keeper having a latch portion located at said upper end of said first arm, and a snap edge located at said upper end of said second arm.

25. The water supply system of claim 16 wherein said hanger members are integrally fabricated of resilient plastic.

26. A water supply system for fowl or small animals, adapted to be used with a suspension system having a plurality of associated flexible lines, comprising:
an elongate ballast member;
a tubular water supply conduit including connecting means for rigidly attaching said ballast member and said conduit, said connecting means being permanently connected to said conduit;
a plurality of dispenser valves connected to and in fluid communication with said conduit, said dispenser valves disposed in alignment with a plane defined by axes of said ballast member and said conduit; and
a plurality of hanger members slidably and rotatably connected to and suspending said ballast member, said hanger members being separate and independent from said connection means such that said hanger members may slide on said ballast member independently of said connecting means, each of said hanger members adapted to be coupled to one of the flexible lines, each said hanger member including first and second arms capable of separation to allow said ballast member to pass through, each said hanger member including latching means for releasably holding said first and second arms together at their upper ends, said latching means including a keeper having a latch portion located at said upper end of said first arm, and a snap edge located at said upper end of said second arm.

27. The water supply system of claim 26 wherein said hanger members can slide anywhere on said ballast member.

28. The water supply system of claim 26 wherein said hanger members can slide within predefined areas along said conduit.

29. The water supply system of claim 26 wherein said first and second arms have terminal loop portions defining an aperture, so that respective flexible lines can be looped through said aperture to connect said hanger member and the suspension system.

30. The water supply system of claim 29 wherein said first and second arms have a width twice that of said terminal loop portions, each of said terminal loop portions movable to align with each other and define said aperture.

31. The water supply system of claim 26 wherein said hanger members are integrally fabricated of resilient plastic.

* * * * *